United States Patent [19]

Anstey et al.

[11] 4,433,619

[45] Feb. 28, 1984

[54] METHOD FOR UNPLUGGING CYLINDRICAL BALER

[75] Inventors: Henry D. Anstey; Gerald F. Meiers; Richard W. Koning, all of Ottumwa, Iowa

[73] Assignee: Deere & Company, Moline, Ill.

[21] Appl. No.: 405,966

[22] Filed: Aug. 6, 1982

Related U.S. Application Data

[63] Continuation-in-part of Ser. No. 308,223, Oct. 5, 1981, Pat. No. 4,391,187.

[51] Int. Cl.$^3$ .................. B30B 5/06; A01D 39/00
[52] U.S. Cl. .................................. 100/40; 100/88; 56/341
[58] Field of Search .............. 100/88, 89, 35, 40; 56/341, 342, 343

[56] References Cited

U.S. PATENT DOCUMENTS

| 3,722,197 | 3/1973 | Vermeer. | |
| 4,182,101 | 1/1980 | Gaeddert et al. | |
| 4,242,857 | 1/1981 | Parrish et al. | 100/88 |
| 4,252,057 | 2/1981 | Gaeddert et al. | |
| 4,258,619 | 3/1981 | Gaeddert | 100/88 |

*Primary Examiner*—Peter Feldman

[57] ABSTRACT

A method is disclosed for unplugging or freeing a cylindrical baler which has a slug of crop material caught in the crop inlet of the bale forming chamber. A cylindrical baler used in the practice of this method is comprised of a plurality of belts supported on a plurality of rolls and defining a bale forming chamber. A pair of rolls on a carrier respectively engage a pair of stretches of the belts and substantially close an upper portion of the chamber. The rolls and carrier are upwardly moveable as the chamber expands responsive to the bale growth. The method comprises steps of (1) disengaging a drive means for the belts; (2) moving the carrier and rolls supported thereon upwardly away from the bale being formed in the chamber thereby enlarging the chamber; (3) automatically tensioning the belts responsive to carrier movement to cause the stretches to rotatably engage the bale and (4) re-engaging the drive means for feeding the slug into the chamber and wrapping the slug around the bale. In accordance with this method, the size of the bale forming chamber and the tension on the belts may be controlled, thereby permitting the bale forming chamber to accommodate large slugs of hay in the unplugging mode of operation and eliminating the need to manually remove the slug as has been typically required with prior art balers.

6 Claims, 6 Drawing Figures

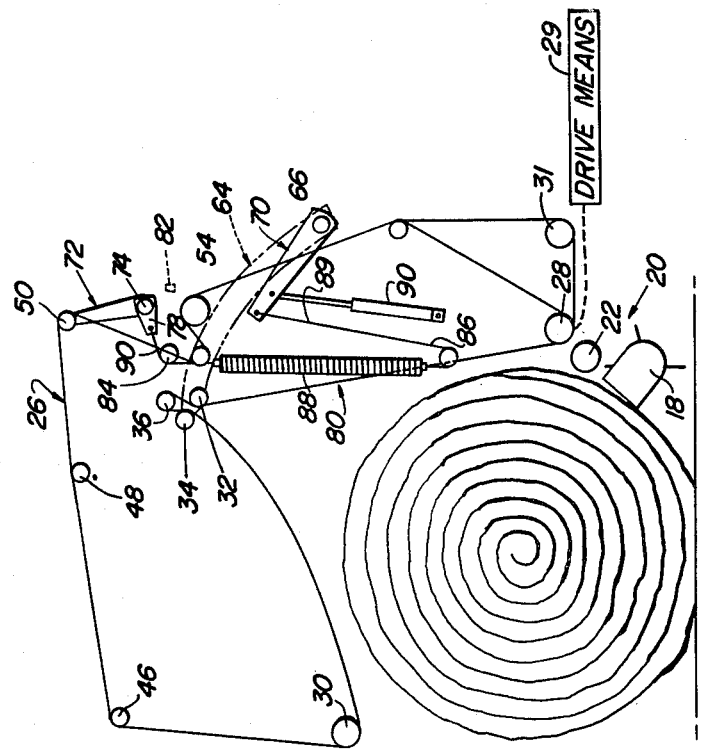
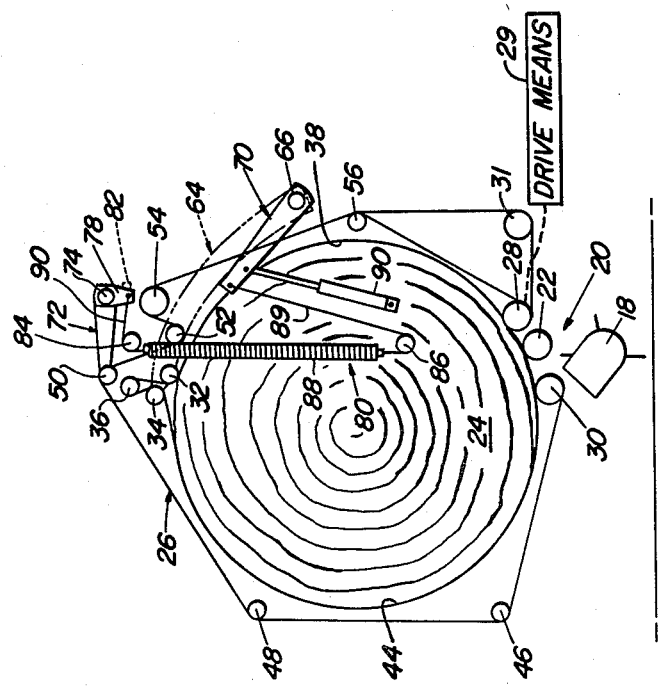

METHOD FOR UNPLUGGING CYLINDRICAL BALER

CROSS-REFERENCE TO RELATED APPLICATION

This is a continuation in part of U.S. application Ser. No. 308,223, entitled BELT-TENSIONING SYSTEM FOR ROUND BALERS, filed on Oct. 5, 1981, now U.S. Pat. No. 4,391,187 in the name of Anstey et al.

BACKGROUND OF THE INVENTION

This invention relates to cylindrical (commonly known as "round") balers for forming cylindical bales and more particularly relates to a method for freeing an expandable bale forming chamber of such a baler of a slug of crop material fed into the crop inlet of the chamber.

One commonly available prior art cylindrical baler is comprised of a frame having a pair of oposed sidewalls, a plurality of rollers extending between the sidewalls, and a plurality of flexible, endless belts supported on the rolls. The belts in conjunction with the rolls define the sides of a bale forming chamber and the frame sidewalls define the endwalls of the bale forming chamber. The belts are driven and apply a compactive rolling force to the crop material fed into the bale forming chamber through a crop inlet into engagement with a pinch point formed between the bale and a lower extremity of the bale forming chamber. A large cylindrical bale is formed by the belts by wrapping a continuous mat of the infed crop material in spiral fashion about a longitudinal, horizontal axis transverse to the direction of travel of the baler through the field. Balers of this type are exemplified in U.S. Pat. No. 4,182,101, and 4,252,057.

Such balers are subject to plugging by the binding of the belts forming the bale forming chamber by the feeding of excessively large slugs of crop material into the crop inlet of the chamber. Such plugging most commonly occurs when operating the baler at near the maximum baling rate. The plugging is usually a result of binding of the belts causing a clutch in drive mechanism to slip. There are at least two known methods for freeing the bale forming chamber of such a baler plugged in this manner. In the first method, the drive means for the belts is shut off and a wrench is used to rotate manually one of the belt supporting rolls (typically a drive roll) in reverse. By rotating a roll in reverse, the belts and the bale are rotated in reverse to free the slug of crop material binding the bale forming chamber. Then, the slug of crop material can be removed by hand. This procedure is undesirable because of the manual labor involved and particularly because it requires a high degree of strength to rotate the bale forming chamber in reverse. A variant of the first method is to provide on the baler a mechanical drive for rotating the bale forming chamber in reverse. This variant is also disadvantageous because of the complexity and cost added to the baler by the provision of a means for driving the bale forming chamber in reverse.

In accordance with the second method for freeing a bale forming chamber plugged in this manner, the partially formed bale in the chamber is discharged on the ground and the slug of crop material is removed by hand from the crop inlet. This method is disadvantageous because a partially formed, untied bale must be discharged on the ground. The partially formed bale must then either be manually tied for transport, rebaled, or left in the untied condition. This method is also undesirable because of the inconvenience of lost time and manual labor involved in its practice.

SUMMARY OF THE INVENTION

Accordingly, it is an object of this invention to provide a method for unplugging a cylindrical baler of the foregoing type which is quick and is easy to perform.

Another object of the invention is to provide such a method which does not require the provision of specialized components usable only for unplugging the baler (e.g. a reversible drive means for the belts of the bale forming chamber.)

Another object of the invention is to provide such method which includes the step of adjusting the size of the bale forming chamber and properly tensioning the belts forming the chamber to permit the chamber to accomodate large slugs of hay without causing severe mechanical difficulties in the operation of the baler.

These and other objects of the invention which will be apparent in the consideration of the following detailed description are accomplished by a method for freeing an expandable bale forming chamber of a cylindrical baler of a slug of crop material fed into an inlet of the chamber as set forth hereinbelow. The baler preferably used to practice a method in accordance with this invention is comprised of a plurality of belts supported on a plurality of rolls and defining a bale forming chamber. The belts include first and second oppositely driveable stretches which define the crop inlet at the lower extremities of the stretches. A drive means is provided for driving the plurality of belts. A carrier supports a pair of closely spaced rolls of said plurality of rolls. The pair of rolls substantially close an upper portion of the chamber and are upwardly moveable on the carrier as the chamber expands responsive to bale growth in the chamber.

The method comprises steps of (1) disengaging the drive means for the plurality of belts; (2) moving the carrier and the pair of rolls away from the bale being formed in the chamber to enlarge the chamber, (3) tensioning the belts causing the stretches to rotatably engage the bale in the chamber, and (4) reengaging the drive means for feeding said slug into the chamber and wrapping the slug around the bale.

In accordance with still further features of the preferred embodiment of the baler used in the practice of the method of this invention, the belts are tensioned by a third adjustably positioned roll of said plurality of rolls. A third stretch of said belts is supported on the third roll. The third roll is interconnected with the carrier such that when the method step of moving the carrier and the pair of rolls away from the bale being formed in the chamber to enlarge the chamber, the method step of tensioning the belts automatically results causing the first and second stretches to rotatably engage the bale in the bale chamber.

In accordance with still another feature of the invention, the baler includes a bale discharge gate having some of the plurality of rollers mounted thereon and supporting, in part, one of the first and second stretches. The gate is moveable between an open position for bale discharge and a closed position for bale formation. Hydraulic means are provided for simultaneously opening the gate and moving the carrier away from the bale and for simultaneously closing the gate and moving the carrier toward the chamber. The carrier is moved by actuating the hydraulic means. Thus, a step of engaging a gate lock valve to prevent the gate from opening is performed prior to actuating the hydraulic means to move the carrier upwardly.

BRIEF DESCRIPTION OF THE DRAWINGS

FIG. 4 is a view similar to FIGS. 2 and 3, but shows a still further stage of operation.

FIG. 5 is a view similar FIGS. 2-4 and shows the completed bale during discharge thereof from the bale forming mechanism.

DETAILED DESCRIPTION OF A PREFERRED EMBODIMENT

Figure 1:
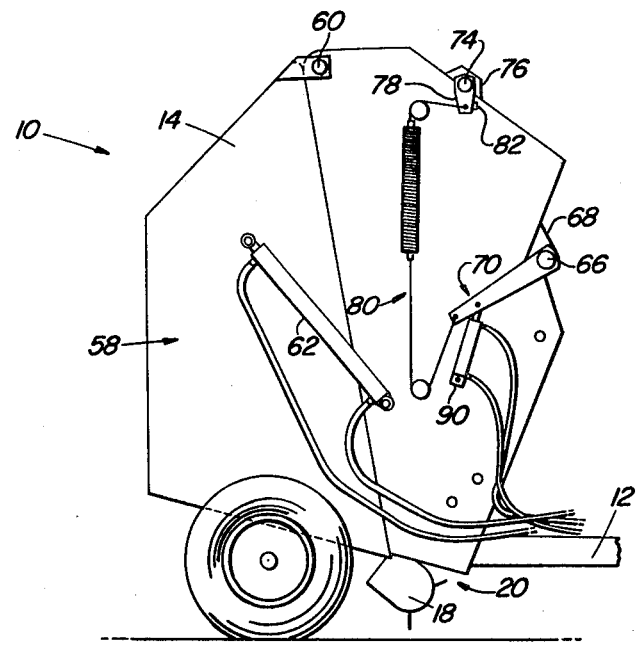
FIG. 1 is a side elevation of a preferred embodiment of a cylindrical baler.

FIG. 1 is referred to first for a general description of a preferred embodiment of a cylindrical baler used in the practice of a method in accordance with the invention herein. A main frame 10 includes a draft tongue 12 for connection to a tractor (not shown) by means of which the baler is caused to advance over a field of previously harvested crops. Main frame 10 has opposite fore-and-aft, vertical sidewalls 14 and 16, the latter of which of course does not appear in FIG. 1 and the former of which has been removed in FIGS. 2 through 5 in order to expose interior components. A typical crop pickup 18 feeds ground-borne crops upwardly to a bale or crop inlet 20 into a bale-forming chamber 24 that increases in diameter as the bale is formed. A transverse roller 22 assists in the formation of a bale core. See FIGS. 2 through 5. Bale-forming chamber 24 is formed by a set or a plurality of transverse rolls and an endless set of belts 26 trained thereabout. Belts 26 are driven by a conventional drive means 29 (not shown) connected between (1) a power-take-off of the tractor (not shown) for pulling the baler and (2) a lower front drive roll 28. Drive means 29 includes a safety friction clutch (not shown) for disengaging when the force required to drive the belts 26 becomes too great. Excessive force may occur when chamber 24 becomes plugged with a large slug of hay as will be explained in further detail below. The set of rolls includes the lower front roll 28, a lower rear roll 30, a staggered roll 31, an intermediate front roll 32, an intermediate rear roll 34 and an upper roll 36. (A baler comprising a bale forming chamber defined by a plurality of belts supported on a plurality of rolls, one of which is staggered as described herein, is disclosed and claimed in U.S. patent application Ser. No. 285,178 entitled STAGGERED ROLLS AND BELTS FOR ROUND BALER, filed on July 20, 1981 in the name of Viaud and assigned to the assignee of this application. The disclosure of U.S. application Ser. No. 285,178 is incorporated by reference herein. A belt stretch 38 extends from the roll 28 to the roll 32 and continues at 40 to the upper roll 36, returning thence downwardly at 42 to a web or stretch 44 to the lower rear roll 30. As will appear subsequently, the stretches 38 and 44 define the initial bale-forming chamber 24 that increases in diameter as the crop is rolled into a bale of ever-increasing size until a predetermined size is attained.

The belts 26 extend rearwardly from the lower rear roll 30 to a rearward lower roll 46, thence upwardly to a roll 48, upwardly and forwardly to a roll 50, down to a third intermediate roll 52, back up to a high roll 54, down to a forward roll 56 and back to the lower front roll 28. The rolls 30, 46, 48 and a portion of belt stretch 44 are carried by a gate means 58 which is essentially the rear portion of the main frame of the machine that is pivoted near the top of the sidewall by a suitable pivot means 60. Gate 58 is moveable back and forth between a closed position for bale formation in chamber 24 and an open position for bale discharge by a hydraulic unit 62 (only one shown in FIG. 1) at each side of the machine and connected hydraulically to the hydraulic system (not shown) of the towing tractor (also not shown).

Figure 2:
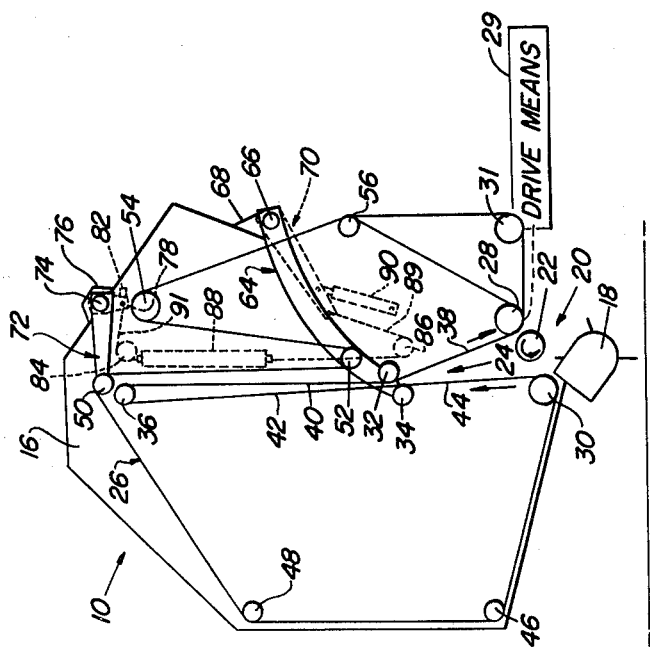
FIG. 2 is a side view, somewhat schematic and with the near sidewall of the baler removed to expose the interior components, but at the same time showing some of the important exterior components in dotted lines.

The three rolls 32, 34 and 52 are journaled on a carrier 64, here comprising a generally fore-and-aft arm just inwardly of each sidewall and secured in common to a transverse pivot shaft 66 rockably carried by the respective sidewalls 14 and 16 as at 68. A lever arm means 70 is fixed to each end of the cross shaft 66 just outwardly of each sidewall (FIG. 2 shows one such arm) and extends rearwardly. The top roll 50 is journaled on mounting means comprising a pair of interior lever arms 72 that are fixed to an upper rockshaft 74 pivoted near opposite ends at 76 on the main frame sidewalls. At each side of the machine, an outer lever arm means 78 is affixed to the near end of the rockshaft outwardly of the respective sidewall. A chain and sprocket arrrangement 80 interconnects the rockshaft lever arm 78 and the carrier means arm 70 at each side of the machine. See FIG. 1 for the near side. A stop 82 is provided for each rockshaft lever arm 78.

The flexible tension member arrangement 80 selected here for the purpose of illustration includes an upper sprocket 84, a lower sprocket 86, a coiled tension spring 88, an upper chain 91 connected to the rockshaft lever arm 78 and trained about the upper sprocket and then connected to the upper end of the spring 88, and a lower chain 89 connected to the lower end of the spring, trained about the lower sprocket 86 and then connected to the free end of the carrier lever arm 70. The chain and sprocket arrangement 80 comprises part of control means for controlling the position of the rolls 32, 34 and 52 as the bale increases in size. The spacing between the rolls 32 and 34 is narrow enough to prevent the bale from escaping upwardly as it is being formed. In other words, the rolls 32 and 34, together with their associated stretches of belt serve to confine the upper part of the bale, yielding together or as a unit to accommodate the ever-increasing size of the bale.

A further part of the control includes at each side of the machine, a hydraulic cylinder and piston unit 90 together with its hydraulic connections to the hydraulic system for example, of the towing tractor. This will be described in connection with FIG. 6.

Figure 6:
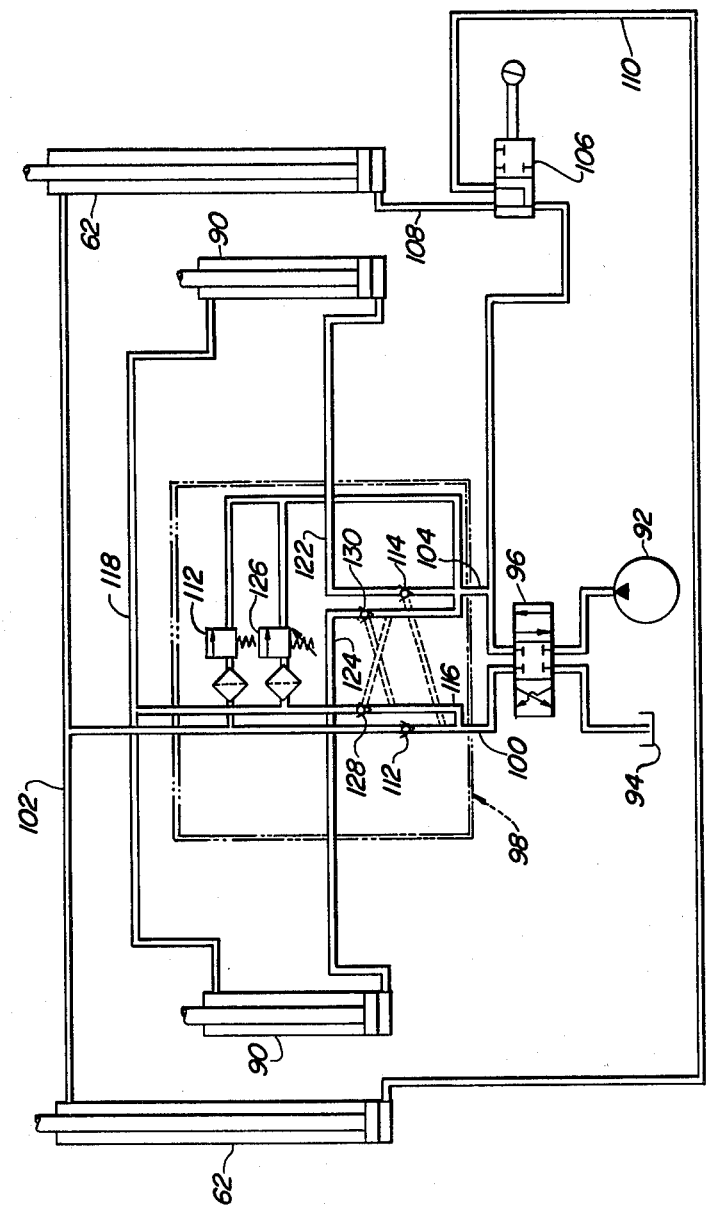
FIG. 6 is a diagrammatic view of a preferred form of hydraulic system used in density control, bale discharge and in the practice of the method of this invention.

A typical basic system such as those conventionally associated with agricultural tractors is shown in FIG. 6 as including a pump 92, reservoir 94 and main control valve 96. As also seen in FIG. 6, the cylinders 62 and 90 are connected in parallel through the intermediary of an intervening valve control means 98. Operation of the gate means cylinders 62 will be considered first. A line 100 leads from the control valve 96 to the upper ends of the cylinders 62 via branches 102. Pressurizing of these lines retracts the cylinders 62. Another line 104 leads from the control valve 96 to the lower ends of the cylinders 62 via a cut-off valve 106 (open in FIG. 6) and branches 108 and 110 to the lower ends of the cylinders 62 for extending the cylinders to open the gate (FIG. 5). When the cut-off valve 106 is closed, the gate cylinders 62 will not extend or retract. A relief valve 112 connected to line 102 prevents damage to the baler or tipping of the baler if the gate hits an object (e.g. the discharged bale) and is unable to close completely following bale ejection.

Operation of the control means cylinders 90 will now be covered. A line 116 leads off from the line 100 to the upper ends of the cylinders 90 via branches 118, and the line 104 leads to the lower ends of the cylinders 90 by means of branches 122 and 124. Adjustable relief valve means 126 (closed in FIG. 6) cross connects the lines 116 and 104. These lines respectively include check valve 128 to preclude leakage back through control valve 96, the dotted lines representing pilot operation of the check valve. Pilot-operated check valves 114 and 130 are provided to prevent retracting of the cylinders 90 unless the pump 92 is operating and the valve 96 is actuated. This system provides a separate line and check valve for each cylinder, which means that at least two components of the system must fail before both hydraulic cylinders can retract accidentally.

Operation

Figure 3:
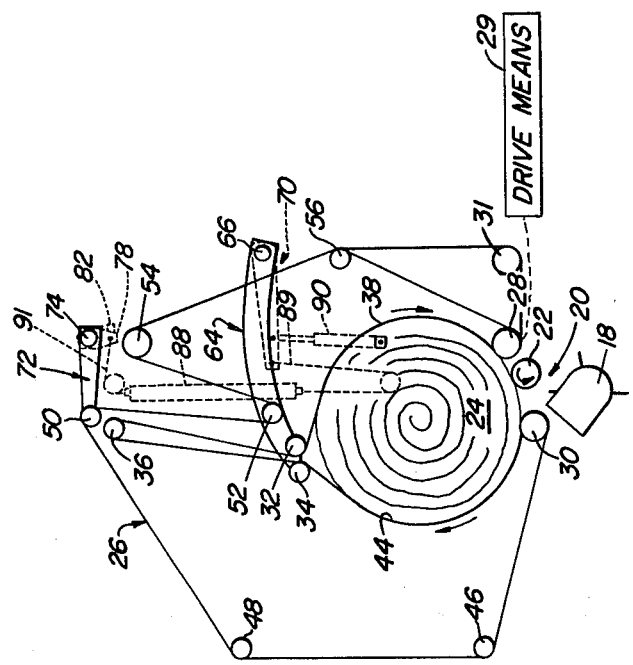
FIG. 3 is similar to FIG. 2, but illustrating a further state in bale formation.

The ground-borne crop is picked up by the pickup 18 and fed to the inlet area 20. The belt stretches 38 and 44 travel in opposite directions (arrows) and start the rolling action to form the core of the bale. As more and more crop is fed via the inlet to the initial chamber 24, the rolling bale increases in size (FIGS. 3 and 4). In the infinite transition from, say, FIG. 2 through FIG. 4, the rolls 32, 34 and 52 move upwardly as the bale grows and as the carrier 64 moves upwardly under control of the cable-sheave-spring system and hydraulic cylinders 90. Bale density can be controlled by varying pressure on the cylinders 90.

The rolls 32 and 34 remain always above the bale during bale formation, during which stage the gate means 58 remains fixed and thus the locations of the gate-carried rolls may be regarded as fixed. The rolls 32 and 34 functon only to maintain bale envelopment. Although these rolls become closer to the bale as the bale grows, they do not exert any appreciable downward force on the bale because of the lifting force exerted by the upper roll lever arm 72 on the carrier roll 52. Actually, it has been found undesirable for the rolls 32 and 34 to exert a downward force on the bale because it causes an increase in power consumption without substantially increasing bale density. If power consumption is ignored, it is possible to increase density by changing the ratios such that the rolls 32 and 34 do exert a downward force on the bale.

Another function of the roll 50 is to compensate for cases of high peak power. The closer the carrier 64 is to the bale, the more power is required to turn or roll the bale. When such conditions exist, the resultant belt forces of the increased drive-induced tension exert an upward force on the rolls 32 and 34 to raise the carrier above the bale. When the bale is dumped (FIG. 5), cylinders 90 function to hold the carrier in an elevated position. This produces belt slack which is desirable for service as well as helping to reduce material build-up.

The advantages of the hydraulic means including the cylinders 90 and valving therefor are that the cylinders provide controlled resistance to upward movement of the carrier in a more efficient manner than springs alone; more constant belt tension and thus more uniform bale density and lower peak power requirements. The resistance to the cylinder system occurs as fluid is exchanged via the upper and lower ends thereof via the adjustable relief valve means 26. During normal bale formation, baler geometry is such that the belt is released by the rolls 32, 34 and 52 at the proper rate such that the roll 50 will remain against its stop 82 (FIG. 1). The spring 88 provides increasing force on the roll 50 as bale size increases to insure enough backside belt tension to prevent belt slippage. This is important because, if an irregular or lumpy bale contacts the rolls 32 and 34, the roll 50 must provide all of the backside tension necessary to drive the belt. When the bale is dumped, both cylinder units 62 and 90 are extended.

It has been found that, in the use of the baler of the foregoing type under certain crop conditions, large slugs of crop material are fed into the crop inlet of the bale forming chamber. If the baler is being operated at near its maximum baling rate, the baling chamber may occasionally become plugged. Plugging of the baling chamber overloads drive means 29 for belts 26 which causes the friction clutch (not shown) to disengage (i.e., slip). In accordance with the features of the method of this invention, bale chamber 24 may be unplugged by disengaging the drive means for belts 26. This may be simply accomplished by disengaging the tractor power take-off. Then, carrier 64 is moved upwardly away from bale 24 to enlarge the bale forming chamber. Simultaneously with the movement of the carrier 64 upwardly, lever arms 72 and roll 50 supported therein are moved clockwise about rock shaft 74 via the flexible tension member (spring 88 and chains 88, 89) interconnected between carrier 64 and lever arm 78. The upward movement of roll 50 increases the tension on belts 26 to accommodate for the enlargement of chamber 24 thereby insuring that belts 26 are sufficiently tensioned for driving by drive means 29. Carrier 64 is moved upwardly by the shifting of valve 96 to connected pump 92 with the lower end of hydraulic cylinders 90. In accordance with the preferred embodiment of the hydraulic circuit shown in FIG. 6, actuation of control valve 96 to extend cylinders 90 also normally extends gate cylinder 62 which would result in the discharge of the bale in the bale forming chamber 24. To avoid the discharge of the bale in accordance with the preferred embodiment, gate lock valve 106 is closed prior to actuating valve 96 to prevent the actuation of gate cylinders 62 simultaneously with the extension of carrier cylinders 90. Following the moving of carrier 64 upwardly and the tensioning of belts 26 by the clockwise movement of lever arms 72, drive means 29 is reengaging by engaging the tractor power take-off. With the reduced load on drive means 29, the friction clutch is engaged and belts 26 are again driven by drive means 29. The slug in crop inlet 20 is then fed into the chamber 24 and is wrapped around the bale, resulting in the unplugging of chamber 24. Following the unplugging of the bale forming chamber, the baling operation may be continued in the normal manner. This is accomplished by returning control valve 96 to a central closed position and by shifting valve 106 back to the open position.

It will be appreciated by those skilled in the art that the unplugging of the bale forming chamber in accordance with the features of this invention is simply and efficiently accomplished without the need for specialized components to reverse the drive of belts 26. In addition, in contrast to prior art balers, no strenuous manual labor is involved in unplugging the machine. The unplugging of the machine is simply accomplished by closing gate lock valve 106 to prevent discharge of the bale and by operation of hydraulic control valve 96 which in this mode controls the size of the bale forming chamber. By controlling the size of chamber 24 in the unplugging mode, the chamber may accommodate the feeding of large amounts of hay which has not heretofore been possible. By this method, manual removal of the slug is no longer necessary.

It will be appreciated by those skilled in the art that if desirable gate cylinder 62 may be separately controlled from carrier cylinders 90 so that the necessity of closing a gate lock cylinder 106 prior to moving carrier 64 upwardly may be omitted.

It will be further understood that while carrier 64 and rolls 32, 34 are preferably located above the bale and are moveable upwardly with increasing bale size, the location thereof may be, e.g. at the rear such that with increasing bale size, the carrier and rolls 32, 34 move rearwardly.

It should also be observed that such expressions as "upper", "lower", etc., her as well as in the appended claims, are used as terms of convenience and not as terms of limitation, because, obviously, the elements could be otherwise oriented. Features and advantage of the invention, not described in detail herein, will be apparent to those skilled in the art, as will many other modifications of the preferred embodiment disclosed, all without departure from the spirit and scope of the invention as defined by the appended claims.

We claim:

1. A method for freeing an expandable bale forming chamber of a cylindrical baler of a slug of crop material fed into the inlet of said chamber, said baler comprising a plurality of belts supported on a plurality of rolls and defining said chamber, said belts include first and second oppositely driveable stretches defining said inlet at lower extremities of said stretches, means for driving said plurality of belts, and a carrier supporting a pair of closely spaced rolls substantially closing a portion of said chamber and moveable as the chamber expands responsive to bale growth in said chamber, said method comprising the steps:
   (a) disengaging said drive means for said plurality of belts;
   (b) moving said carrier and said pair of rolls away from a bale being formed in said chamber to enlarge said chamber;
   (c) tensioning said belts causing said stretches to rotatably engage said bale in said chamber; and
   (d) reengaging said drive means for feeding said slug into said chamber and wrapping said slug around said bale.

2. The method of claim 1 wherein (1) said belts are tensioned by an adjustably positioned third roll of said plurality of rolls, (2) a third stretch of said belts is supported on said third roll and (3) said third roll is interconnected with said carrier and automatically increases the tension on said belts when said carrier is moved away from said bale.

3. The method of claim 1:
   wherein (1) said baler includes (i) a bale discharge gate having some of said plurality of rolls mounted thereon and supporting, in part, one of said first and second stretches, said gate is moveable between an open position for bale discharge and closed position for bale formation and (ii) hydraulic means for simultaneously opening said gate and moving said carrier away from said bale chamber and for simultaneously closing said gate and moving said carrier toward said bale and (2) in step (c) said carrier is moved away from said bale by actuating said hydraulic means; and
   further comprising the step of engaging a gate lock valve for preventing the opening of said gate prior to moving said carrier away from said bale.

4. A method for unplugging an expandable bale forming chamber of a cylindrical baler of a slug of crop matrial fed into an inlet of the chamber comprising the steps of:
   (a) disengaging a drive means for a plurality of belts defining said chamber,
   (b) enlarging said chamber around a partially formed bale in said chamber,
   (c) tensioning said belts and causing said belts to rotatably engage said bale; and
   (d) reengaging said drive means for feeding said slug into said chamber and wrapping said slug around said bale.

5. The method of claim 1 wherein said belts are automatically tensioned simultaneously when said chamber is enlarged.

6. The method of claim 5:
   wherein said baler includes hydraulic control means for opening a bale discharge gate and enlarging said chamber; and further comprising the step of engaging prior to step (b) a gate lock valve for preventing the opening of said gate.

* * * * *